Figure 1:
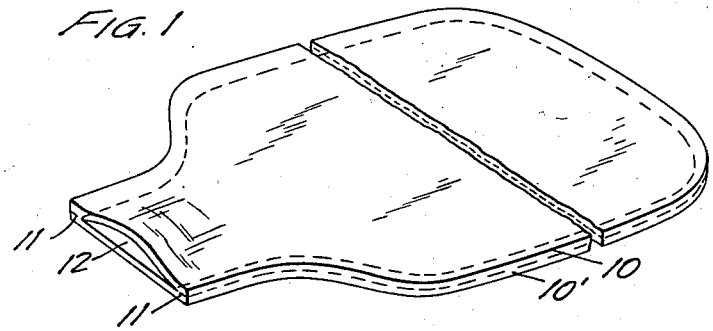

March 26, 1957 W. F. MIKISKA 2,786,792
METHOD OF MAKING POLYTETRAFLUOROETHYLENE ARTICLES
Filed May 6, 1953

INVENTOR
WILLIAM F. MIKISKA
BY
Carpenter, Abbott, Coulter & Kinney
ATTORNEYS

United States Patent Office 2,786,792
Patented Mar. 26, 1957

2,786,792

METHOD OF MAKING POLYTETRAFLUORO-ETHYLENE ARTICLES

William F. Mikiska, St. Paul, Minn., assignor to Minnesota Mining & Manufacturing Company, St. Paul, Minn., a corporation of Delaware Application May 6, 1953, Serial No. 353,332

2 Claims. (Cl. 154—83)

This invention relates to seamed articles composed of thin polytetrafluorethylene film and to a method of making the same. The polytetrofluorethylene film is completely inert toward most chemicals, non-porous, and strong and flexible within wide temperature ranges. The seams are highly resistant to flexing. Although not limited thereto, the invention is particularly concerned with expulsion bags such as are employed in forcing concentrated nitric acid, used in propellant charges for rockets, into contact with the other components of the charge. Similarly produced bags are also useful as containers for corrosive chemicals.

Polytetrafluorethylene films were originally made by skiving or slicing from a solid block of the polymer. Extrusion methods for producing narrow film strips have also been developed. The sintered polytetrafluoroethylene film obtained by these and other methods is tough, strong, dense and flexible. The film is also substantially completely inert toward most chemicals and solvents; and as a result, it has been found impossible to bond sections of the film together with any known adhesives.

The present invention makes possible the formation of hollow sealed structures such as flexible envelopes or expulsion bags of edge-bonded polytetrafluoroethylene film. The bag or bladder may be pressed flat without folding or creasing any portion of the film. The seams or edge areas are firmly bonded, the bond being fully as strong as the film itself.

The invention also provides a simple and effective method for the rapid and efficient manufacture of flexible seamed polytetrafluoroethylene envelopes.

In practicing the invention, there is employed a preformed self-supporting film of unsintered polytetrafluoroethylene. Such a film is conveniently prepared by extruding or rolling a non-aqueous, hydrocarbon-lubricated paste of polytetrafluorethylene particles into thin film or sheet form, and then extracting the lubricant. Typically, the polytetrafluorethylene particles are obtained by polymerizing the monomer in aqueous suspension, coagulating the dispersion, and removing the aqueous phase. A lubricant, such as mineral oil or petroleum jelly, is dissolved in a suitable volatile solvent and mixed with the coagulum, and the solvent, together with any remaining water, is removed by evaporation. A typical commercial example of lubricated polytetrafluorethylene paste suitable for making unsintered self-supporting films is available under the designation of "Teflon" extrusion paste No. TE-3060, containing about 18-21 percent of mineral oil lubricant.

The film prepared by extruding or rolling the extrusion paste is usually found to be oriented in the direction of extrusion, so that its tensile strength in this direction is greater than in the crosswise direction. Thick films may be calendered between steel pressure rollers in a crosswise direction to provide thinner films having cross-orientation, and films have been made by such methods which have substantially equal tensile strength in both lengthwise and crosswise direction. Tensile strengths of the order of 1–8 lbs. per half-inch width of 4-mill film are typical.

Removal of the lubricant by extraction with a suitable valatile solvent leaves a soft, opaque and porous film product which is suitable for assembly into bags or other containers in accordance with the principles of this invention.

One typical form of article which has been found useful in demonstrating the effectiveness and efficiency of the invention is a simple envelope consisting of two coextensive sheets of polytetrafluoroethylene film sealed together along three sides and with an open-ended neck or extension at the fourth side.

Figure 2:
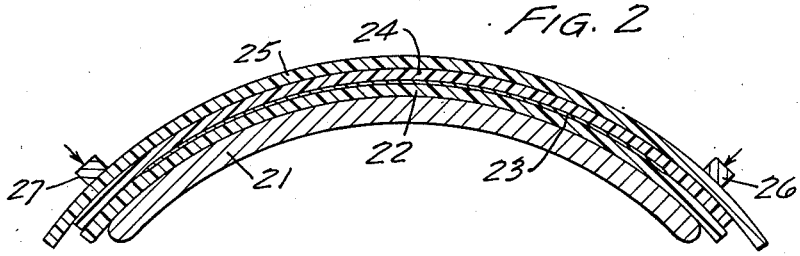
Figure 3:
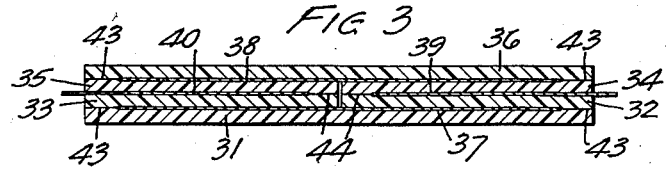
Figure 4:
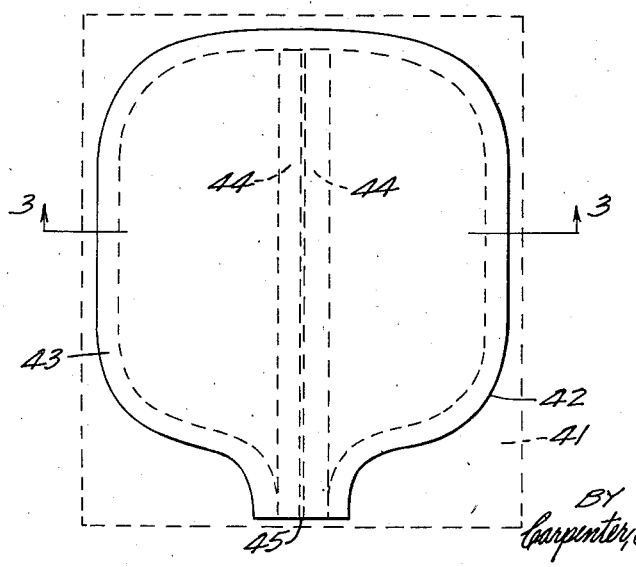

In the drawing, Figure 1 illustrates in perspective an envelope as just described. Figure 2 is a longitudinal cross-section showing the envelope of Figure 1 during construction. Figure 3 is a cross-section of a different envelope during construction, and Figure 4 is a plan view of the envelope of Figure 3.

The envelope of Figure 1 consists of two coextensive flat sections of non-porous, dense, tough and flexible sintered polytetrafluoroethylene film 10, 10', bonded together along three sides at the edge area 11 to form an enclosure which is open on the fourth side at the restricted mouth area 12.

In making the envelope of Figure 1, an arcuate form 21 as indicated in Figure 2 may conveniently be employed as a base or work-surface. A section of porous, unsintered polytetrafluoroethylene film 22 is first stretched smoothly over the base surface. This section is preferably slightly larger than the finished envelope. A section of thin metal foil 23 is next placed over the film 22. This section of foil has the dimensions desired for the interior open unbonded area of the completed envelope. A second section of unsintered polytetrafluoroethylene film 24, substantially coextensive with the first film 22, is next stretched smoothly over the lower members, and a final compression member 25 is stretched over the completed assembly. The composite "sandwich" is held in place on the smooth base and under continued tension by means of suitable holding members, here indicated by pressure clamps 26 and 27, at either end.

The force which may be applied in stretching the several layers into position must be substantially less than the tensile strength of the films in order to prevent rupture of the metal foil and undue distortion of the plastic film. However the film must be so firmly held in place that adequate pressure is exerted between the contacting surfaces within the seams to cause them to weld together during sintering of the film. It is sometimes helpful to press the layers together as by means of a roller, after clamping, so as to ensure complete contact of the two surfaces within the seam. The application of the outer compression member 25 is also helpful in bringing the edge areas of the upper film 24 into smooth and uniform pressure contact with the corresponding edge areas of the lower film 22.

With the assembled composite thus held together and in place on the supporting base 21, the entire assembly is heated above the sintering temperature of the polytetrafluoroethylene, i. e., above 327° C. It is then cooled, the cover 25 is removed, and the sintered polytetrafluoroethylene article, containing the metallic insert 23, is stripped from the base 21 and trimmed to shape, thereby exposing the edge of the tongue-like extension of the metal foil section 23 at the constricted side of the container. The films 22 and 24 are found to be converted to the dense, non-porous, tough and flexible sintered form, and to be firmly bonded together along the contacting edge areas 11 of Figure 1. They are also found to be adhered to the contacting surfaces of the metal insert 23, as would be expected based on the experience of prior art workers with sintered spray-coated films of polytetrafluoroethylene dispersions on metal sheets. Surprisingly, however, it is found that the bond established between one or the other of these sintered pre-formed self-supporting porous films of polytetrafluoroethylene and the foil insert may be broken by severe flexing or by inflation of the container. The foil is then easily and quickly dissolved and removed by appropriate chemical action, e. g. solution in aqua regia or in other appropriate chemical solution. Removal of the chemical solution, rinsing and drying then complete the preparation of the polytetrafluoroethylene envelope of Figure 1.

In a specific example, a polished 1/16 inch stainless steel sheet, curved to a radius of one foot, was used as the base 21. Three strips of unsintered porous lubricant-free polytetrafluoroethylene film five mils (.005 inch) thick, 6.75 inches wide and 25 inches long were consecutively stretched over the curved base under a tension, uniformly applied across the full width of the strip, of between about 5 and 10 pounds, causing the strips to stretch about 5% of their original length. The strips were temporarily anchored in place as applied, and permanent clamps were then affixed at both ends of the composite structure as indicated in Figure 2. A section of thin aluminum foil 5.25 inches wide, 21 inches long, and narrowed at one end, was placed between the first and second layers, and a larger section of the same foil, sufficient to cover the entire second layer, was placed between the second and third layers of the polytetrafluoroethylene film, prior to stretching the film sections into position. The latter section of foil, not illustrated in Figure 2, serves to prevent adherence of the polytetrafluoroethylene film 24 to the compression cover 25 when the latter is also a polytetrafluoroethylene film. The assembly was rolled with a wooden hand-roller to remove air pockets and ensure uniform contact of the several layers, and was then placed in an oven at 750° F. for about 10 minutes. On removal from the oven, the assembly was quenched in water and the clamps removed. The outer layer of polytetrafluoroethylene film was first stripped from the aluminum foil beneath. The remaining structure was stripped from the curved metal base and trimmed to shape, leaving a half-inch seam along three edges of the enclosed aluminum foil and exposing the foil at the end of the narrowed portion. One of the two polytetrafluoroethylene strips was then broken away from the enclosed aluminum, for a short distance along the free edge by hand action, and from the remainder of the enclosed foil by filling the container with water under pressure. The aluminum foil was removed from the inside of the envelope and also from the outer surface by solution in hydrochloric acid; dilute sulfuric acid or sodium hydroxide is equally effective. The envelope was rinsed clean and dried, producing the article of Figure 1. The caliper of the film in the finished envelope was about 3.5 mils.

The more complicated structure of Figures 3 and 4 is produced in accordance with the same principles outlined in connection with that of Figures 1 and 2. The separate sheets 31, 32, 33, 34, 35 and 36 of porous unsintered lubricant-free polytetrafluoroethylene are assembled, together with aluminum foil forms 37, 38, 39 and 40, in stack or sandwich form in the manner indicated in cross-section in Figure 3, the cross-section being taken at section line 3—3 of Figure 4 with respect to the completed envelope. The composite is formed under tension on a curved base and covered with a compression cover, heated to or somewhat above the sintering temperature, cooled, and removed, as previously described in connection with Figures 1 and 2. The initial outline of the several portions of film is indicated in Figure 4 by dotted line 41. The envelope 42 is then trimmed to shape, the edges of the aluminum foil layers 37 and 38 being thus exposed at the edge 45 of the restricted area as shown in the figure, and the sintered film is broken loose from the aluminum foil sections. The sections of foil may then be removed by chemical action, and the envelope cleaned and dried.

Where the envelope is to be used as a corrosion-resistant container for corrosive chemicals, aluminum sections 37 and 38 lying within the container 42 must be removed by chemical action or the like. For some purposes, it will be apparent that the aluminum coating on one or more of the surfaces of the envelope is of no consequence. As previously explained, the surprising ability of the in situ sintered polytetrafluoroethylene film to be mechanically loosened from the aluminum foil makes possible the efficient and economical removal of such foil from the interior of the envelope. It also permits the expansion of the bellows-like sides of the envelope without preliminary chemical removal of the aluminum sections 39 and 40, which are thereafter, depending on the use to which the container is to be put, either removed or allowed to remain harmlessly attached to the exterior surface of the completed container.

The exterior edge areas 43 and the interior edge areas 44 are found to be firmly cohered or bonded together. The envelope may be expanded to its fullest extent, as by filling with compressed air, without causing failure of the bonded seam. Flexibility and strength are maintained over a wide range of temperatures, as required of envelopes designed for use with the fuming nitric acid component of rocket propellant charges. Due to the type of construction employed, there are no folds in the polytetrafluoroethylene film of which the envelope is made. This is important in avoiding cracking and splitting of the film, since it has been found that the extreme stresses imparted to the somewhat rigid film by sharp folding, and particularly by folding at low temperatures, results in a cracking and weakening of the film and frequently in failure of the envelope.

Copper foil, or other heat-resistant base-metal foils which can readily be dissolved, may be substituted for the thin aluminum foil. Layers of the metal deposited directly on the unsintered polytetrafluoroethylene film in the desired pattern, for example by vapor deposition through a stencil, also provide effective removable separator members.

Clamping the assembly of polytetrafluoroethylene films and metallic separator layers over a curved base and beneath a compression member provides a convenient method of maintaining the required uniform pressure contact along the seams between opposing edge areas during sintering. The polytetrafluoroethylene film tends to contract somewhat during sintering, thus providing continued pressure at the seams.

The presence of a compression covering is also helpful in this respect, as well as in providing an additional safeguard against the formation of cracks, pinholes, wrinkles, and other such imperfections in the polytetrafluoroethylene film during sintering. The combination of unsintered polytetrafluoroethylene film and aluminum foil previously described serves as an effective compression cover, although other non-adherent conformable and heat-resistant materials, e. g. glass cloth, may be substituted. Acceptable containers have also been made in the absence of any compression cover.

Application of uniform continuous pressure to the structure during the heating and quenching operations by means of clamps, metal forms, or the like is effective, but uniform heating is difficult under such conditions. These and other considerations make the specific method as hereinbefore described the preferred method of making the flexible polytetrafluoroethylene containers of this invention; but other equivalent methods, as well as other equivalent specific structures, will be apparent in view of the foregoing description, and such non-inventive modifications are to be considered as coming within the ambit of the appended claims.

What is claimed is as follows:

1. The method of making a flexible polytetrafluoroethylene film envelope which comprises: assembling together in stack form a plurality of layers of soft, porous, unsintered, lubricant-free polytetrafluoroethylene film and, between each two adjoining layers of said film and in contact with all areas of said film which are designed to become free surfaces of said envelope, corresponding thin layers of metal; heating the stack to a temperature and for a time sufficient to cause sintering of the film to the dense, non-porous, strong, tough, flexible, sintered state and to cause contacting surfaces of adjacent layers of film to cohere and bond together; cooling the assembly; and then opening and expanding said envelope; said stack being maintained under uniform and continuous pressure during said heating and cooling steps.

2. The method of making a flexible polytetrafluoroethylene film envelope which comprises: assembling together in curved stack form, and under uniform tension, a plurality of layers of soft, porous, unsintered, lubricant-free polytetrafluoroethylene film and, between each two adjoining layers of said film and in contact with all areas of said film which are designed to become free interior surfaces of said envelope, corresponding thin layers of aluminum foil; heating the assembly to a temperature and for a time sufficient to cause sintering of the film to the dense, non-porous, strong, tough, flexible, sintered state and to cause contacting surfaces of adjacent layers of film to cohere and bond together; cooling the assembly; mechanically separating the aluminum foil from at least one of the two layers of sintered polytetrafluoroethylene in contact therewith; and then removing the aluminum from the interior of the envelope.

References Cited in the file of this patent

UNITED STATES PATENTS

| | | |
|---|---|---|
| 1,995,518 | Perry | Mar. 26, 1935 |
| 2,259,239 | Brown et al. | Oct. 14, 1941 |
| 2,283,069 | Knuetter | May 12, 1942 |
| 2,298,421 | Salfisberg | Oct. 13, 1942 |
| 2,400,099 | Brubaker et al. | May 14, 1946 |
| 2,466,387 | Curtis et al. | Apr. 5, 1949 |
| 2,520,173 | Saunders | Aug. 29, 1950 |
| 2,566,266 | Uhle et al. | Aug. 28, 1951 |
| 2,578,522 | Edgar | Dec. 11, 1951 |
| 2,584,632 | Southwick | Feb. 5, 1952 |
| 2,584,633 | Southwick | Feb. 5, 1952 |
| 2,665,132 | Robinson | Jan. 5, 1954 |

FOREIGN PATENTS

| | | |
|---|---|---|
| 361,647 | Great Britain | Nov. 26, 1931 |